June 17, 1958
E. S. KLEINMANN ET AL
2,838,991
PORTABLE COOKING STOVE AND STAND
Filed Nov. 25, 1953
3 Sheets-Sheet 1
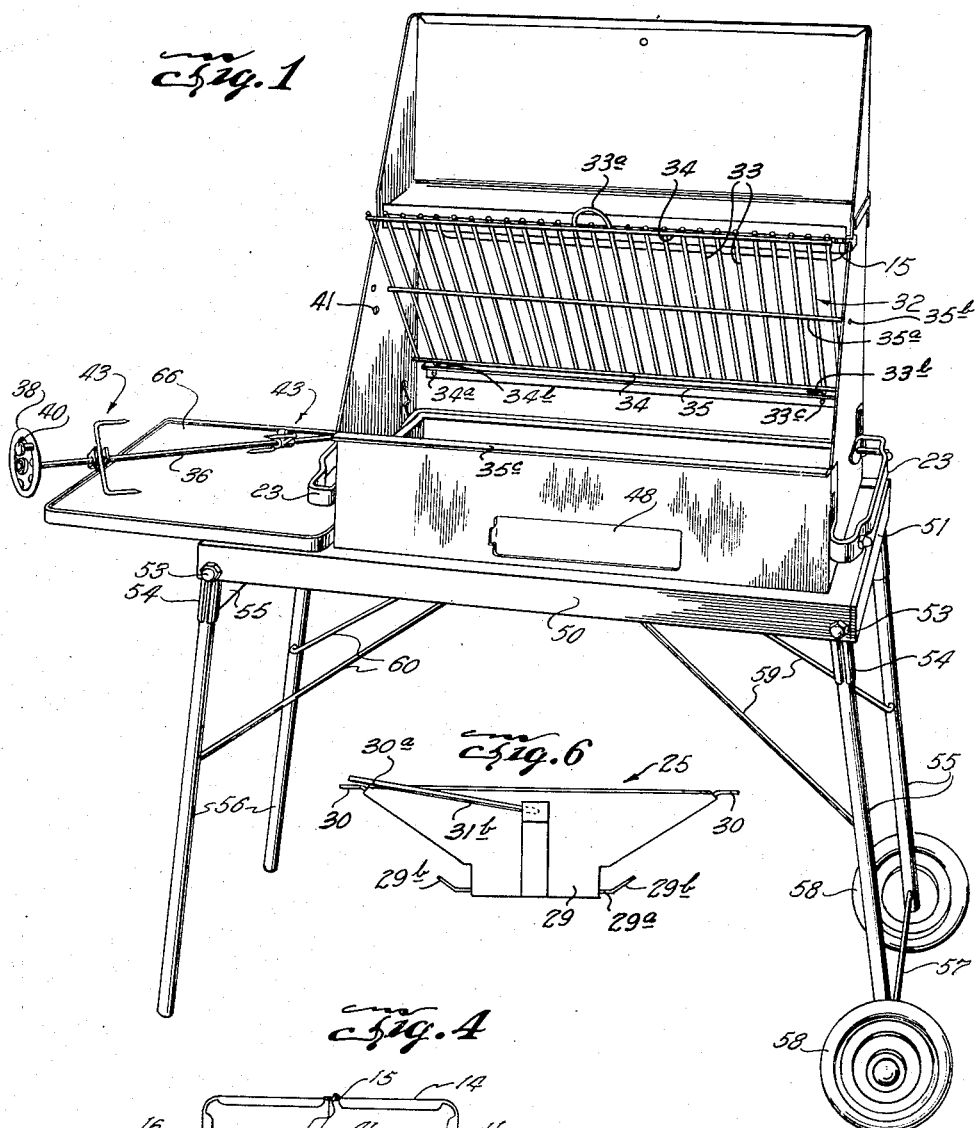
ERWIN S. KLEINMANN
ARTHUR C. KELLER
CLYDE R. HORN
ALBERT E. LINDBLOM
DUBART A. MOORE  INVENTORS
ATTORNEY

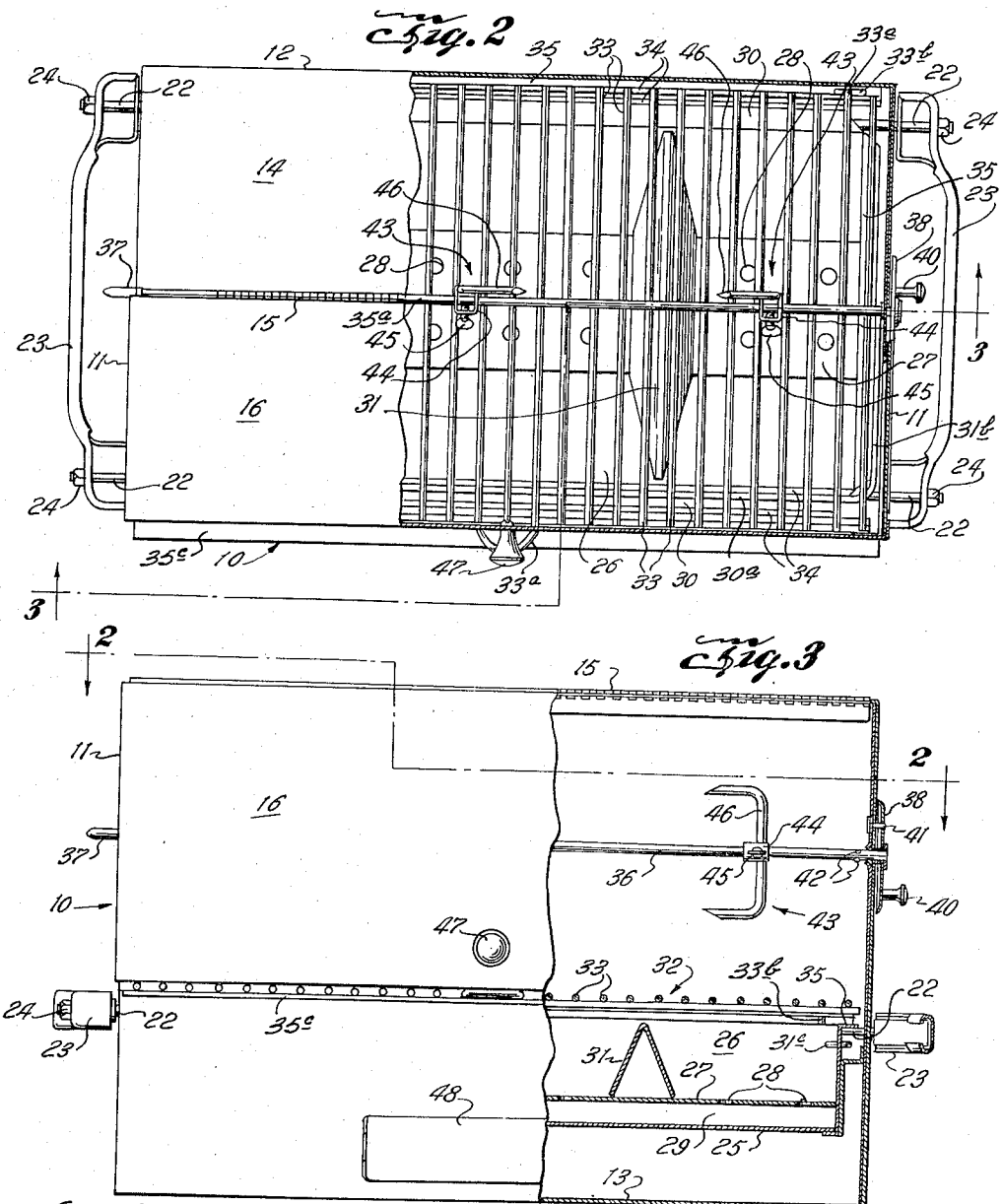

June 17, 1958 E. S. KLEINMANN ET AL 2,838,991
PORTABLE COOKING STOVE AND STAND
Filed Nov. 25, 1953 3 Sheets-Sheet 3
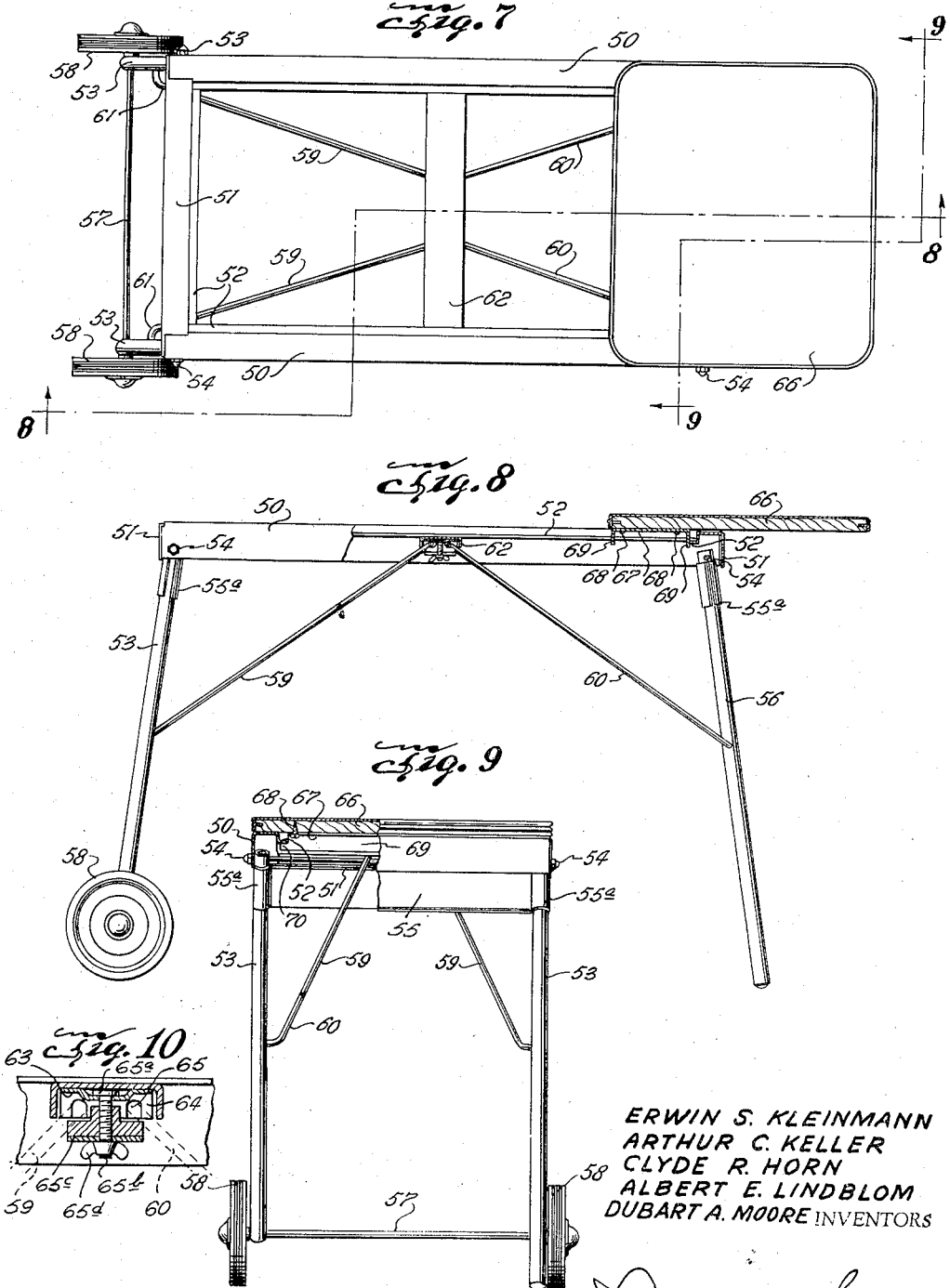
ERWIN S. KLEINMANN
ARTHUR C. KELLER
CLYDE R. HORN
ALBERT E. LINDBLOM
DUBART A. MOORE INVENTORS
BY
ATTORNEY

United States Patent Office 2,838,991
Patented June 17, 1958

2,838,991

PORTABLE COOKING STOVE AND STAND

Erwin S. Kleinmann, Arthur C. Keller, Dubart A. Moore, Clyde R. Horn, and Albert E. Lindblom, Dallas, Tex., assignors to Dearborn Stove Company, Dallas, Tex.

Application November 25, 1953, Serial No. 394,418

1 Claim. (Cl. 99—421)

This invention relates to portable apparatus for broiling, baking and barbecuing out-of-doors and more particularly to a stove grill and a collapsible stand therefor.

The principal object of the invention is to provide a cooking hood wherein the novelty resides in the unique construction and relationship of the few parts making up the stove, the manner of their cooperative function, relative adjustability and the ease in which the parts may be dismantled for cleaning.

Another object of the invention is to provide a portable grill in which the oven is equipped with a fire pan designed with sloping sides for keeping the fire centered in the middle of the grill as well as permitting the metal walls of the pan to expand and thus prevent distortion under heat. Moreover, provision is made for lifting the pan from the oven for disposing of fuel or fuel residue, the latter being entrapped in an ash receptacle below and integral with the pan, hence, the stove itself is kept free of such residue.

Still another object of the invention is to provide a portable stand adapted to support the cooking stove, which is of simple and collapsible construction for convenient storage or transportation in an automobile, the stand being equipped, when in operative position, with a cutting board in juxtaposition with the stove, for the convenient preparation of foods.

Other objects will appear as the description proceeds, when considered with the annexed drawings wherein:

Figure 1 is a front perspective view of a cooking stove and portable stand constructed according to the invention.

Figure 2 is a top plan view of the stove per se, partly in section, taken on line 2—2 of Figure 3.

Figure 3 is a side elevational view partly in section, taken on line 3—3 of Figure 2.

Figure 4 is an end elevational view of the cooking stove.

Figure 5 is a top plan view of the fire pan per se.

Figure 6 is an end elevational view thereof.

Figure 7 is a top plan view of the portable stand.

Figure 8 is a side elevational view of the stand, partly in section, taken on line 8—8 of Figure 7.

Figure 9 is an end elevational view, partly in section, taken on line 9—9 of Figure 7, and Figure 10 is a fragmentary view showing the leg locking assembly of the stand.

Continuing with a more detailed description of the drawing, reference is made primarily to Figures 1 to 4, inclusive, wherein numeral 10 denotes generally the cooking stove, which is designed for grilling, broiling, barbecuing or baking. The stove is comprised of the ends 11, rear wall 12, bottom 13 and top 14. The top 14 extends forwardly to a point at the approximate midsection of the casing of the stove where a piano-type hinge 15 joins the edge of the top with a cover or closure 16 whose sides 17 (Figure 4) are substantially triangular and which form a continuation of the end walls 11 of the casing when the cover is in closed position. In like manner, the front wall of the closure constitutes half of the front wall of the stove casing which terminates at a point slightly below the midsection of the stove casing at its front.

In Figure 4 is will be observed that each end wall 11 of the stove casing has an opposed vertical slot 18 adjacent each side thereof. Each slot 18 has a straight edge 19 opposed by an edge having vertically spaced, inwardly and upwardly directed projections 20, the notches 21 between the projections of one slot being in direct alignment with like notches 21 in the complementary slot 18.

The above described slots receive rods 22, one of which extends entirely through the stove 10 along its rear wall while the other rod extends along the front wall thereof, both rods extending beyond the end walls 11 and through matched apertures in the ends of a loop handle member 23 at each end of the stove. Nuts 24 are threaded onto the ends of the rods to hold the handles in place.

The rods 22 serve a dual purpose. First, they support a fire pan 25 (Figure 3) and also afford a medium by which the pan 25 may be raised and lowered to correspondingly move the burning fuel therein in relation to the food thereabove. To adjust the fire pan, the handles 23, which are heat insulated, are raised or lowered and the rods 22 are deposited into selected notches or recesses 21 of the slots 18. It will be observed that the handles must first be moved towards the front of the stove against the straight edges 19 of the slots and then moved in the opposite direction to lodge the rods in the selected slots 21.

The fire pan 25 has inclined side walls 26 receding towards a center portion 27 which is coextensive with the length of the fire pan. The center portion 27 has a series of spaced apertures 28 through which falls the residue of the fuel after it has been consumed. This residue is received in the open sided chamber 29 of the pan below the false bottom or portion 27 thereof, the bottom 29a of the pan having upturned edges 29b (Figure 6) to retain the residue. Along the side edges of the fire pan are flanges 30 which rest upon the parallel supporting rods 22 in the manner best shown in Figures 2 and 3.

A lifting bail is provided for the fire pan 25 consisting of a rod whose midsection 30a rests upon and in parallelism with the forward side flange 30 of the pan and whose end portions 31b are turned at right angles to lie adjacent the ends of the pan. The extremities of the portions 31a are bent into hooks 31c which extend through apertures in the ends of the pan.

Disposed within the fire pan 25 are inverted V-shaped spacers 31 which are movable to enable the user to confine the fire or charcoal to a narrow width if the full length of the grill is not required or if separate fires producing heat of different intensity are needed.

A grill 32 is formed of transverse rods 33 and longitudinal rods 34 adjacent each longitudinal edge thereof. At the front midsection of the grill, a loop 33a is formed to provide a handle and at each end of the grill one end 33b of one of the transverse rods 33 is bent 90° to be received in a longitudinal slot 33c adjacent the end of a rear supporting rail 35 affixed to the rear wall 12 of the oven. Such engagement of the ends 33b with slots 33c not only provides hinging means for the grill but also enables the grill to be shifted from side to side. An intermediate longitudinal grill rod 35a extends beyond the width of the grill so that when the grill is raised to an approximate 45° position and shifted toward either end this extended rod 35a engages in holes 35b provided in the end members 11 of the oven, thus holding the grill in raised position to allow for convenient filling of the fire pan with fuel or for its removal from the oven for the purpose of emptying ashes. When in operative position over the fire pan, the front edge of the grill rests upon a longitudinal flange 35c provided along the front wall of the oven.

Extending longitudinally through the stove casing 10 is a spit shaft 36, one end 37 extending through an opening in one end 11 of the casing while the opposite end of the shaft is secured to a disc 38, which lies against the outer surface of the opposite end wall 11 of the casing 10. This disc has a series of annularly spaced apertures 39 therein which, when the disc is turned by the handle 40 thereon, may be brought selectively into alignment with a stud 41, protruding from the end wall 11. The disc 38 is then moved inwardly so that the stud will enter the selected aperture and thus hold the spit shaft 36 against rotation. Endwise movement of the shaft 36 is limited by diametrically opposed projections 42 (Figure 3) thereon on the end wall 11 opposite the disc 38.

Removably mounted on the shaft 36 are spit forks 43, each consisting of a substantially U-shaped mounting member 44 whose legs are provided with matching apertures for slidably receiving the shaft 36. A wing screw 45 holds the mounting 44 against displacement from adjusted positions on the shaft. Welded to the ends of the legs of the mounting member is a U-shaped fork 46 whose prongs extend in parallelism with the shaft 36, one fork confronting the companion fork on the shaft and holding the food being cooked between them. By rotating the shaft by the handle 40 the food is cooked uniformly over the fuel burning in the fire pan 25.

By removing the spit shaft, food may be grilled on the rack 32 or baked thereon by closing the cover 16. A handle 47 is attached to the cover 16 for manipulating the same and a draft control opening having a slidable closure 48 is provided in the lower portion of the front wall of the stove casing 10.

In Figures 7, 8, 9 and 10 is shown the portable stand for the cooking stove described in the foregoing. This stand is comprised of the elongate side angle members 50 and end angle members 51 constituting the frame. The inner edges of the side and end members 50 and 51 are turned downwardly, thence inwardly to form a continuous flange 52 and which flange constitutes a support for the cooking stove, as shown in Figure 1, from which the stove can be conveniently lifted, the same requiring no securing means to hold it on the support.

A rod 54 extends transversely through the frame adjacent each end thereof and to one of these rods is pivotally connected the upper end of the leg assembly 53. A leg bracket 55 (Figure 9) is formed of two strips of metal, welded together in parallelism and having their ends rolled to form sleeves 55a which embrace the legs 53 adjacent their upper ends. In like manner, the leg assembly 56 is pivoted by means of the companion rod 54, the legs being joined by the bracket 55. The legs 53 carry a transverse axle shaft 57 adjacent their lower ends on each end of which is a rubber tired wheel 58. The legs 56 are longer than legs 55 and their ends rest upon the ground. This holds the stand against movement and permits the same to be transported from place to place on wheels 58 by lifting the opposite end of the stand.

Their legs can obviously be folded into substantial parallelism with the frame of the stand and to hold the legs firmly in extended position shown, braces 59 and 60 are provided. These braces are identical, each consisting of a rod formed into a substantially V-shape with its lower ends turned outwardly as at 61 (Figure 7) and extended into holes made in the confronting faces of the legs 53. In like manner, the ends of the legs of brace 60 are turned to enter confronting holes in legs 56. The convergent upper ends of the brace members 59 and 60 are adapted to be received in juxtaposition by an inverted transverse channel member 62, which extends from one side frame member 50 to the other at the approximate midsection of the frame. Welded to the channel member 62 within the confines of its flanges is a bracket 63 (Figure 10) having depending end flanges 64, each of which has spaced apart recesses 65, the recesses in one end flange being in alignment with the recesses in the opposite flange to receive the bight portion of the braces 59 and 60 in the manner shown in dotted lines in Figure 10. The bracket 63 has a longitudinal depression in which is disposed the head 65a of a bolt 65b. A latching member 65c is apertured to receive the bolt 65b and bears against the portions of the braces 59 and 60 which lie in the recesses 65 of the bracket 63, thus holding them securely in place. A wing nut 65d threaded onto the bolt 65b holds the latch member 65c against displacement.

Mounted for longitudinal sliding movement on the frame is a cutting board 66. To hold the board for such displacement on the frame, a plate 67 is secured to its underside by screws 68. Each end of plate 67 is turned downwardly into a flange 69. By observing Figure 9, it will be seen that each flange 69 has a cut-out portion at each end defining a projection 70 which extends under the side flanges 52 of the frame side members 50, thus holding the board 66 against upward displacement but permitting free endwise movement.

Manifestly, the construction as shown and described is capable of some modification and such modification as may be construed to fall within the scope and meaning of the appended claims is also considered to be within the spirit and intent of the invention.

What is claimed is:

In a portable cooking stove, the combination comprising a casing having opposed end and side walls, the latter having opposed flanges, said end walls each provided with a pair of spaced apart vertical slots having notches in one edge thereof, the slots in one end of said casing being aligned with corresponding slots in the opposite end thereof, a rod extending through each pair of aligned slots and through said casing, means joining the ends of said rods exteriorly of said casing at each end thereof and defining handles for lifting said casing and for engaging said rods selectively with the notches in said slots to raise and lower said rods, a fire pan having opposed side flanges resting on said rods within said casing and movable therewith, said fire pan having an apertured false bottom and an open sided chamber below said false bottom for the reception of fuel residue passing downwardly through the apertures of said false bottom, a supporting rail for a grill affixed to and coextensive with the rear wall of said casing and having a longitudinal slot in each end, said grill composed of a plurality of transverse rods, the endmost rods having their rear ends extended and bent at right angles to said transverse rods for reception in the slots of said supporting rail to permit hinging and lateral sliding displacement of said grill, said grill being supported at its opposite side on the flange of the companion side wall of said casing, means carried by said grill receivable in apertures in the end walls of said grill to hold the latter in raised position, a longitudinally movable spit shaft rotatable in said casing above said grill, means for rotating said spit shaft, means for locking the latter against rotation, and a pair of spit forks adjustably mounted on said spit shaft, each comprising a substantially U-shaped mounting member whose legs are formed with aligned holes receiving said spit shaft and a substantially U-shaped fork member affixed at its bight portion to the legs of said mounting member, the ends of said fork lying parallel with said spit shaft, means for securing said mounting member in adjusted positions on said spit shaft, means for holding said spit shaft against rotation, comprising a disc mounted on one end of said spit shaft and having a plurality of annularly spaced apertures therein and means protruding from one end of said stove casing adapted to be selectively received in the aperatures of said disc when said spit shaft is shifted longitudinally in said casing.

References Cited in the file of this patent

UNITED STATES PATENTS

| | | |
|---|---|---|
| 1,913,418 | Wallinder | June 13, 1933 |
| 2,225,861 | Dufour | Dec. 24, 1940 |
| 2,245,220 | Nelson | June 10, 1941 |
| 2,307,914 | Bitney | Jan. 12, 1943 |
| 2,536,630 | Elmer | Jan. 2, 1951 |
| 2,556,365 | McKnight | June 12, 1951 |
| 2,559,710 | Danielsen | July 10, 1951 |
| 2,580,126 | Randolph | Dec. 25, 1951 |
| 2,608,190 | Winning et al. | Aug. 26, 1952 |
| 2,666,420 | Pollard | Jan. 19, 1954 |